United States Patent [19]
Singh et al.

[11] Patent Number: 6,132,636
[45] Date of Patent: Oct. 17, 2000

[54] LEAK-DETECTING REFRIGERANT COMPOSITIONS CONTAINING OXAZOLYL-COUMARIN DYES

[76] Inventors: Rajiv R. Singh, 18 Foxfire Dr., Getzville, N.Y. 14068; Robert J. Schiller, Jr., 14 W. Main St., Morristown, N.J. 07945; Harold J. Kieta, 45 Grove St., Buffalo, N.Y. 14207

[21] Appl. No.: 09/178,028

[22] Filed: Oct. 23, 1998

[51] Int. Cl.[7] .............................. C09K 5/00; C09K 5/04; G01M 3/20
[52] U.S. Cl. .............................. 252/68; 252/67; 252/964; 73/40.7
[58] Field of Search ................................ 252/68, 67, 964; 73/40.7

[56] References Cited

U.S. PATENT DOCUMENTS

| | | | |
|---|---|---|---|
| Re. 35,370 | 11/1996 | Henry | 73/40.7 |
| Re. 35,395 | 12/1996 | Henry | 73/40.7 |
| 3,770,640 | 11/1973 | Bartlett | 252/68 |
| 3,985,763 | 10/1976 | Harnisch | 548/217 |
| 4,369,120 | 1/1983 | Stelz et al. | 252/68 |
| 4,758,366 | 7/1988 | Parekh | 252/68 |
| 5,149,453 | 9/1992 | Parekh | 252/68 |
| 5,167,140 | 12/1992 | Cooper et al. | 73/40.7 |
| 5,264,368 | 11/1993 | Clarke et al. | 436/3 |
| 5,286,803 | 2/1994 | Lindsay et al. | 525/329.7 |
| 5,673,722 | 10/1997 | Brass | 137/15 |
| 5,674,000 | 10/1997 | Kalley | 362/293 |
| 5,681,984 | 10/1997 | Cavestri | 73/40.7 |
| 5,742,066 | 4/1998 | Cavestri | 250/504 |

FOREIGN PATENT DOCUMENTS

19819020A1  11/1999  Germany.

OTHER PUBLICATIONS

SAE J2297; Society of Automotive Engineers: Ultraviolet Leak Detection: Stability and Compatibility Criteria of Fluorescent Refrigerant Leak Detection Dyes for Mobile R–134–a Air Conditioning Systems; Issued Sep. 1996.

SAE International, Surface Vehicle Standard, Ultraviolet Leak Detection: Stability and Compatibility Criteria of Fluorescent Refrigerant Leak Detection Dyes for Mobile R–134a Air Conditioning Systems, Sep. 1996.

*Primary Examiner*—Christine Skane
*Attorney, Agent, or Firm*—Jay Friedenson; Colleen Szuch

[57] ABSTRACT

Refrigerant compositions containing oxazolyl-coumarin dyes for leak detection under ultraviolet light, and methods for the use of such dyes in leak detection.

17 Claims, 1 Drawing Sheet

LEAK-DETECTING REFRIGERANT COMPOSITIONS CONTAINING OXAZOLYL-COUMARIN DYES

FIELD OF THE INVENTION

The present invention relates to leak detection compositions and their method of use in refrigeration systems, and more particularly to such compositions and methods using fluorescent oxazolyl-coumarin dyes.

BACKGROUND OF THE INVENTION

Dyes are often added to refrigeration systems to enable one to detect leaks of refrigerant. At the site of the leak, escaping refrigerant containing a dye is visible, thereby enabling one to see the leaking fluid. U.S. Pat. Nos. 3,770,640 and 4,369,120 are directed to the use of visible anthraquinone dyes as a means of detecting refrigerant leaks. However, such dyes may be indistinguishable from other colored fluids which may be present, such as colored fuels and lubricating oils used in engines and motors.

To improve detectability, dyes which fluoresce under ultraviolet light have been developed for use in refrigerant leak detection systems. These are an improvement over daylight visible dyes, which may be difficult to see or to distinguish from non-refrigerant fluids which may be present. Escaping refrigerants containing fluorescent dyes are particularly visible when viewed under ultraviolet light, thereby facilitating the leak detection process.

U.S. Pat. Nos. 4,758,366 and 5,149,453 are directed to leak detection compositions comprising fluorescent, alkyl substituted perylene dyes. However, the patent teaches that such perylene dyes are formulated with mineral oil, which makes them unsuitable for use with many refrigerants and refrigerant lubricants. Also, perylene dyes have been found to have limited temperature stability in systems which have high temperature cycles, such as automobile air conditioning systems.

Reissue Patent Nos. 35,370 and 35,395 describe the use of fluorescent naphthalimide dyes in refrigerant leak detection systems. However, certain naphthalimide dyes have been found to precipitate out of solution in pure hydrofluorocarbon refrigerants at low temperatures, such as below about 5° C.

Many of the existing dyes have been found to be unstable or unsuitable for use at the extremes of high and low temperatures to which refrigerants and refrigerant oils are exposed. In addition, many of these dyes are not sufficiently soluble in the fluorocarbon fluids commonly used in current refrigeration systems. In view of these considerations, the S.A.E. International engineering society has established standards for ultraviolet leak detection dyes used in mobile air conditioning systems. In particular, SAE Surface Vehicle Standard J2297 (issued September, 1996) is directed to "Stability and Compatibility Criteria of Fluorescent Refrigerant Leak Detection Dyes for Mobile R-134a Air-Conditioning Systems" (hereinafter, the "J2297 Standard"), which document is incorporated herein by reference. R-134a is the designation for 1,1,1,2-tetrafluoroethane ($CF_3$-$CH_2F$) which is a fluorocarbon refrigerant commonly used in mobile, as well as stationary, systems. The J2297 Standard sets forth procedures for testing various properties, including stability, solubility and fluorescence, of dyes which are to be introduced into mobile air-conditioning systems for the purpose of allowing the application of ultraviolet leak detection.

Coumarin dyes are a broad class of dyes derived from coumarin (1,2-benzopyrone) used for many purposes, including coloring textiles, plastics and paints. U.S. Pat. No. 5,286,803 provides a general discussion of coumarin dyes, although it is directed to the use of polymerizable coumarin dyes for the preparation of coumarin dye-containing polymers.

U.S. Pat. No. 5,681,984 discusses the use of a wide variety of dyes in refrigeration leak detection systems, including naphthalimide, perylene, coumarin, anthracene, phenanthracene and thioxanthene. However, there are no examples using any coumarin dyes, and no teaching of any specific coumarin dyes suitable for use in such applications.

Thus, there is a need for a fluorescent dye for use in detecting leaks from refrigeration systems which is soluble in the hydrofluorocarbon refrigerants and able to withstand the extremes of high and low temperature to which such refrigerants are exposed. In particular, there is a need for such a dye which is able to meet the requirements of the J2297 Standard. The present invention fulfills this need.

DESCRIPTION OF THE INVENTION

Figure 1:
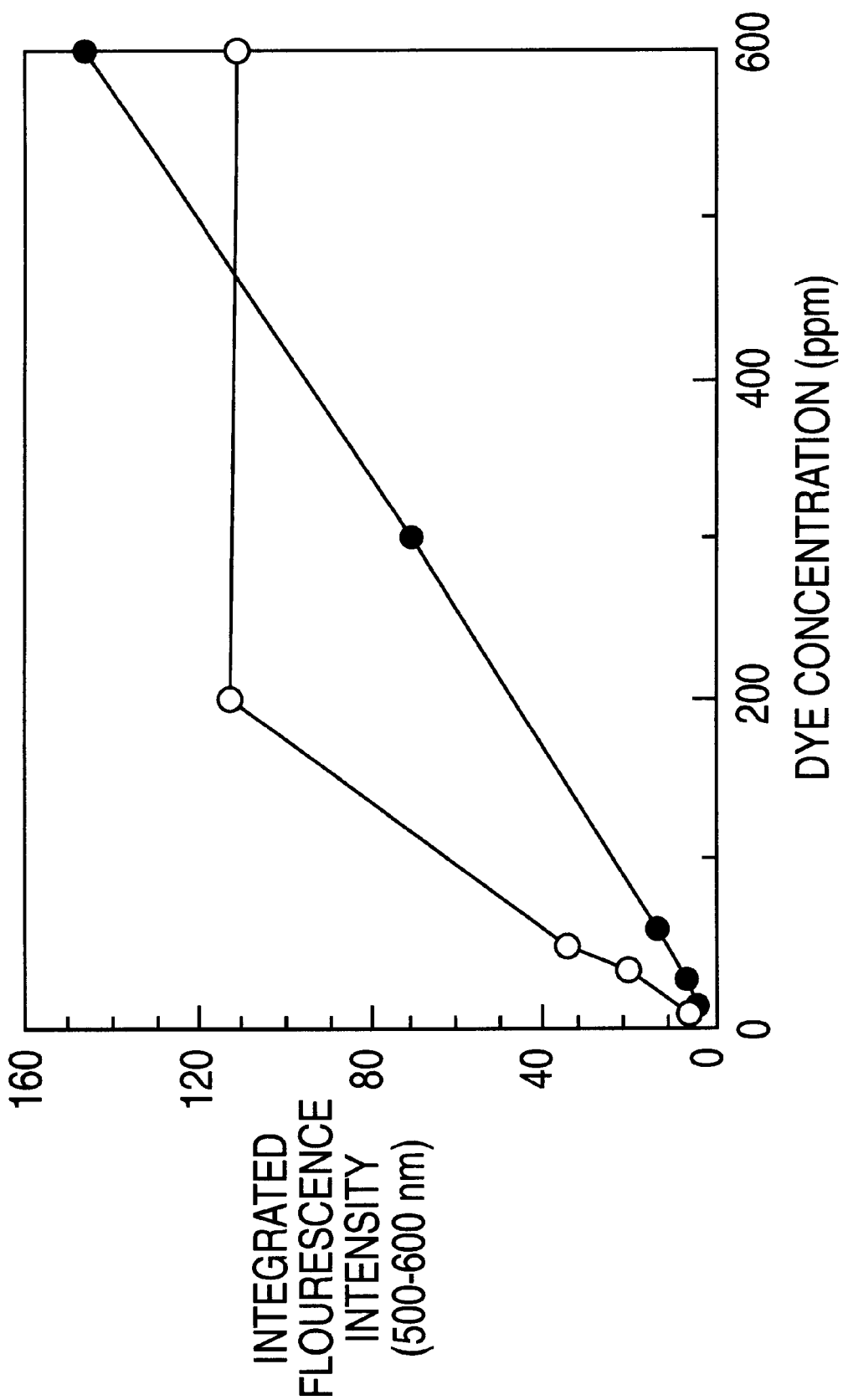
FIG. 1 is a graph comparing the fluorescence intensity of an oxazolyl-coumarin dye in accordance with the present invention to that of a commercially available naphthalimide dye.

In accordance with the present invention, it has been discovered that a particular class of coumarin dyes can be used for the detection of leaks in refrigeration systems by incorporating such dyes into the refrigerant. The suitable coumarin dyes are ones of the type known as oxazolyl-coumarins, as described in U.S. Pat. No. 3,985,763, incorporated herein by reference. The coumarin dyes need to be soluble in the refrigerant to which they are being added.

As indicated in the '763 patent, such dyes can be made polar or non-polar, depending on the attached substituent groups. 30 Generally, the refrigerants of the present invention are non-polar hydrofluorocarbons (HFCs) or hydrochlorofluorocarbons (HCFCs), and therefore the dye preferably should also be non-polar.

In a preferred method of the present invention, enough dye is mixed with the refrigerant such that the concentration is about 10 to about 1000 parts per million (ppm) by weight, more preferably about 50 to about 500 ppm. Unless indicated otherwise, all percentages and proportions provided herein are given by weight. The dye can be added directly to the refrigerant, or can first be dissolved in a small amount of a refrigerant, refrigeration lubricant or oil, or mixtures thereof to form a dye concentrate which is then added to the refrigerant in the refrigeration system. The refrigerant used in the dye concentrate can be the same as or different from that used in the refrigeration system. The dye or dye-oil mixture can be placed into a container to which the refrigerant is added, or pumped into a pressurized container which already contains refrigerant.

Particularly good results have been obtained using a substituted oxazolyl-coumarin dye identified by CAS registry number 35773-42-3, with the CAS chemical name 3-benzooxazol-2-yl-7-diethylamino-chromen-2-one. This dye compound and a method for its manufacture are specifically set forth in the '763 patent, where it is identified as a an "oxazolyl-coumarine", and shown as formula (4) at column 26, line 45, and in claim 7, in column 50. A commercial dye sold under the name D-824, available from DayGlo Corporation comprises this dye. This oxazolyl-coumarin is represented by the formula:

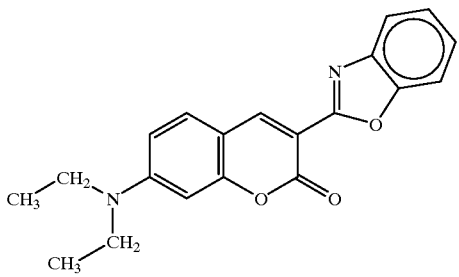

Preferably, the dyes of the present invention are suitable for use in mobile air conditioning systems in accordance with the criteria set forth in S.A.E. Standard J2297, which includes various tests to show that the dyes are suitable for use in a refrigeration system which uses the fluorocarbon refrigerant R-134a. Among other requirements, the dye must be stable and fluorescent after aging at elevated temperature (14 days at 175° C.). The dyes of the present invention were found to meet all of the requirements set forth in Standard J2297.

EXAMPLES

In the following tests, a preferred dye of the present invention was evaluated in accordance with Standard J2297, and compared to other commercially available dyes. The dyes were evaluated in accordance with the stability testing procedure of J2297, Section 7, and the fluorescence testing procedure of J2297, Section 8.

Stability Testing:

Stability testing was conducted in accordance with the procedure of J2297, Section 7. A test sample of dye was dissolved to a concentration of 500 ppm by weight in UCON® 488 polyalkylene glycol (PAG) oil, a refrigeration lubricant used in the air conditioning industry, and commercially available from Union Carbide. A test liquid was made up of ⅓ of the PAG oil with dye, ⅓ polyester (POE) and ⅓ mineral oil. One mL of this liquid was added to a 10 cm³ pressure-rated glass stability tube. Metal catalysts were added, consisting of 3 mm by 19 mm coupons of steel and copper, separated by a coupon of aluminum. The tube was frozen and evacuated, and 1 mL (1.2 g) of R-134a refrigerant (containing 1 percent R-12 (dichlorodifluoromethane)) was added. The tube was then sealed by glass blowing. Thermal aging was performed by placing the tube in a protective metal jacket, and aging in an oven at 175° C. for 14 days. After this, the tube was removed and the contents sampled.

For each test sample, three acceptance criteria for stability were evaluated in accordance with Section 7.4 of Standard J2297.

1) The acid number for each sample was determined by titration with KOH, and compared to that of control neat samples containing no dye. The acceptance criterion is that the acid number should be no higher than the control.

2) The metal coupons were examined for any increase in corrosion or copper plating as compared to the neat samples.

3) The third acceptance criterion is that the presence of the dye shall not cause an increase in particles, precipitates or insolubles in the sealed tubes when compared to the neat samples.

Fluorescence Testing:

Fluorescence testing was conducted in accordance with the procedures set forth in Section 8 of Standard J2297. The preparation of the dye samples was essentially the same as in the stability testing, except that the test liquid consisted of equal amounts (1 mL each) of pure R-134a refrigerant and PAG lubricant. For each dye, a first sample was prepared at recommended service concentration, and a second sample for thermal aging was prepared at twice the concentration. The second samples were then thermally aged with metal catalysts as in the above stability testing. All of the samples were examined for fluorescence under UV light from a commercial UV lamp as would be used in servicing air conditioning systems. The aged samples were compared to the fresh samples of the same dyes, to test for degradation of the dyes. The different samples were also compared to each other, and ranked by visual determination of fluorescence.

Example 1

Example 1 was a sample of DayGlo® D-824 oxazolyl-coumarin dye, in accordance with the present invention, which was tested by the above procedures for stability and fluorescence testing and compared with other commercially available dyes. Several of the other dyes, whose exact compositions are proprietary, are characterized as "coumarin" dyes, but are not oxazolyl-coumarin dyes.

The sample of Example 1 oxazolyl-coumarin dye met all of the stability criteria as set forth above. That is, when the test sample was compared to the neat sample after thermal aging: 1) there was no increase in the acid number; 2) there was no increase in corrosion or plating; and 3) there was no increase in particles, precipitates or insolubles.

In the fluorescence testing, all of the dyes tested were thermally stable. That is, there were no visible differences between the aged second samples and the fresh first samples. However, the oxazolyl-coumarin dye of Example 1 was visually brighter when compared to the other tested dyes, in both the fresh and thermally aged samples.

COMPARATIVE EXAMPLES

The above test procedures were performed on the following commercial dyes, which included some identified as coumarin dyes. None of the dyes tested showed any visible corrosion or plating in violation of the second criterion, so this will not be discussed further. The comparative dyes which were tested were as follows:

1) COUMARIN-7™ dye, 3-(2-benzothiazolyl)-7(diethylamino)coumarin, commercially available from Aldrich Chemical, has the same molecular weight as the above oxazolyl-coumarin dye but has an imidazolyl group instead of a oxazolyl group. It appeared that only about one quarter of this dye dissolved in the refrigerant, with the rest remaining as undissolved residue. Thus, the dye did not meet the third of the stability criteria. Furthermore, the sample was much less bright (due to low solubility) when compared to the dye of Example 1.

2) LUMILUX® Yellow-Green CD-314 dye, commercially available from AlliedSignal, has a proprietary structure which is identified as a coumarin derivative. However this dye is not an oxazolyl-coumarin, as defined in the '763 patent. This dye dissolved better than the COUMARIN-7 dye in the refrigerant, but still showed residue after aging. Also, it was not as bright as the dye of Example 1, and therefore less suitable for leak detection.

3) INTRAWITE® MOL dye, commercially available from Crompton & Knowles, is also identified as a coumarin derivative. The exact chemical structure of this dye is not known, but analysis showed that it is not an oxazolyl-coumarin. This dye gave unacceptably high acid numbers during testing, and therefore did not meet the requirements of the first of the above stability criteria. It was also less bright than Example 1 in the fluorescence testing.

4) INTRAWITE® OB dye, also from Crompton & Knowles, is identified as a benzoxyzole dye. Although it met the above stability requirements, it was found to have much less fluorescent brightness than the dye of Example 1.

5) INTRAWITE® EBF concentrate dye from Crompton & Knowles is of unknown composition, but its fluorescent brightness was much lower than that of the dye of Example 1.

6) UVITEX® OB dye from CIBA Geigy is identified as a benzoxyzole dye. It was found to have an unacceptably high acid number in accordance with the first stability criterion, and also was not as bright as the dye of Example 1 in the fluorescence testing.

Example 2

The dye of Example 1 was compared for fluorescent brightness with a commercially available dye which has been certified as meeting the criteria of S.A.E. Standard J2297. This comparative dye is identified as a naphthalimide dye, available under the name STAY-BRITE® from Bright Solutions, Inc. Samples of each dye were dissolved at varying concentrations in a simulated air conditioning fluid consisting of 70 wt % R-134a and 30 wt % PAG oil. Each test sample was placed in Fisher-Porter high pressure glass tube and analyzed by spectrophotometer. The samples were excited under 484 nm UV light, and fluorescence emission was measured over a visible light range of 500 to 600 nm. FIG. 1 is a graphical representation of the integrated fluorescence intensity (500–600 nm) of the oxazolyl-coumarin dye of Example 1 (open circles) compared to the STAY-BRITE® dye (solid circles), at concentrations of up to about 600 parts per million (ppm). The results show that at a concentration of 200 ppm, the dye of Example 1 was much brighter than the 20 comparative dye at a concentration of 300 ppm. The concentration which normally would be used commercially for such dyes is about 200 to 400 ppm.

Example 3

In this example, the solubility of the oxazolyl-coumarin dye of Example 1 was compared to the naphthalimide dye used in Example 2. Samples of each dye were dissolved to about 200 ppm at room temperature in pure R-134a. The samples were then cooled to −20° C. The naphthalimide dye began to precipitate out of solution at about 5° C., while the oxazolyl-coumarin dye remained fully dissolved down to −20° C.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. The foregoing description is by way of example only, and not limiting. The invention is limited only as defined in the following claims and equivalents thereto.

What is claimed is:

1. A leak-detecting refrigerant composition comprising a refrigeration liquid selected from the group consisting of hydrofluorocarbon refrigerant, refrigeration oil, and mixtures of hydrofluorocarbon refrigerant and refrigeration oil, and an oxazolyl-coumarin dye which is soluble in said refrigeration liquid in an amount effective to render the composition fluorescent under ultraviolet light.

2. The composition of claim 1 wherein the oxazolyl-coumarin is non-polar.

3. The composition of claim 1 wherein the oxazolyl-coumarin is 3-benzooxazol-2-yl-7-diethylamino-chromen-2-one.

4. The composition of claim 1 wherein the refrigeration liquid comprises 1,1,1,2-tetrafluoroethane.

5. The composition of claim 1 wherein said dye meets the stability testing criteria set forth in Section 7 of S.A.E. Standard J2297, as issued in September 1996.

6. The composition of claim 1 wherein said dye meets all of the testing criteria set forth in Section 7 of S.A.E. Standard J2297, as issued in September 1996.

7. The composition of claim 1 wherein the dye is present at a concentration of from about 10 to about 1000 parts per million by weight.

8. The composition of claim 7 wherein the concentration is from about 50 to about 500 parts per million by weight.

9. A method of detecting leaks in a refrigeration system that uses a circulating hydrofluorocarbon refrigerant, the method comprising mixing a soluble oxazolyl-coumarin dye with said refrigerant in an amount effective to render the refrigerant fluorescent under ultraviolet light.

10. The method of claim 9 wherein said oxazolyl-coumarin dye is non-polar.

11. The method of claim 9 wherein said oxazolyl-coumarin dye is 3-benzooxazol-2-yl-7-diethylamino-chromen-2-one.

12. The method of claim 9 wherein said refrigerant comprises 1,1,1,2-tetrafluoroethane.

13. The method of claim 9 wherein said dye meets the stability testing criteria set forth in Section 7 of S.A.E. Standard J2297, as issued in September 1996.

14. The method of claim 9 wherein said dye meets all of the testing criteria set forth in Section 7 of S.A.E. Standard J2297, as issued in September 1996.

15. The method of claim 9 wherein the dye is present in the refrigerant at a concentration of from about 10 to about 1000 parts per million by weight.

16. The method of claim 15 wherein the concentration is from about 50 to about 500 parts per million by weight.

17. The method of claim 9 wherein said mixing comprises forming a dye concentrate by combining the dye with a quantity of a refrigerant, which may be the same as or different from the refrigerant in the refrigeration system, refrigeration oil, or a mixture of refrigerant and refrigeration oil, and then adding the dye concentrate to the refrigerant in the refrigeration system.

* * * * *

UNITED STATES PATENT AND TRADEMARK OFFICE
CERTIFICATE OF CORRECTION

PATENT NO. : 6,132,636
DATED : October 17, 2000
INVENTOR(S) : Rajiv R. Dingh, Robert J. Schiller, Jr., Harold J. Kieta It is certified that error appears in the above-identified patent and that said Letters Patent is hereby corrected as shown below:

On the title page, insert
    --Assignee: AlliedSignal Inc., Morristown, N.J.--

Signed and Sealed this

Fifteenth Day of May, 2001

Attest:

NICHOLAS P. GODICI

Attesting Officer

Acting Director of the United States Patent and Trademark Office